United States Patent [19]
Haas

[11] 3,727,048
[45] Apr. 10, 1973

[54] CHEMICAL TRACER METHOD OF AND STRUCTURE FOR DETERMINATION OF INSTANTANEOUS AND TOTAL FLUID FLOW MASS AND VOLUME

[76] Inventor: Rudy M. Haas, 8171 Forestlawn, Detroit, Mich. 48234

[22] Filed: May 10, 1971

[21] Appl. No.: 141,749

[52] U.S. Cl. .................................. 250/43.5 MR, 250/43.5 R, 250/43.5 FC
[51] Int. Cl. .......................................... G01n 21/26
[58] Field of Search ............ 250/43.5 FC, 43.5 MR, 250/106 T, 43.5 R

[56] References Cited

UNITED STATES PATENTS

| | | | |
|---|---|---|---|
| 2,945,127 | 7/1960 | Hanson | 250/106 T X |
| 3,182,192 | 5/1965 | Vander Ploeg | 250/43.5 FC |
| 3,108,184 | 10/1963 | Hull | 250/43.5 FC |

*Primary Examiner*—Archie R. Borchelt
*Attorney*—Whittemore, Hulbert & Belknap

[57] ABSTRACT

Total mass flow of a fluid component is determined by structure for and the method of inserting a chemical tracer into a flowing fluid at a known mass flow rate, removing a mixed sample of the flowing fluid and tracer, analyzing the concentration of tracer and the concentration of a component of the flowing fluid, the total mass of which is to be determined, determining the ratio of tracer to component of interest, integrating the ratio over a predetermined time and multiplying the result by the mass flow rate of the tracer inserted into the main fluid flow. The total particulate mass flow and total volume flow as well as instantaneous mass, particulate mass and volume flows are determined by similar structures and methods.

A method of expressing tracer concentrations in analyzers rather than in main fluid flow tubes and a method of taking into account tracer components present in the main flow tube before insertion of the tracer into the main fluid flow are provided. Cancellation of tracer components in the main fluid flow upstream of the point of injection of tracer is also disclosed.

20 Claims, 2 Drawing Figures

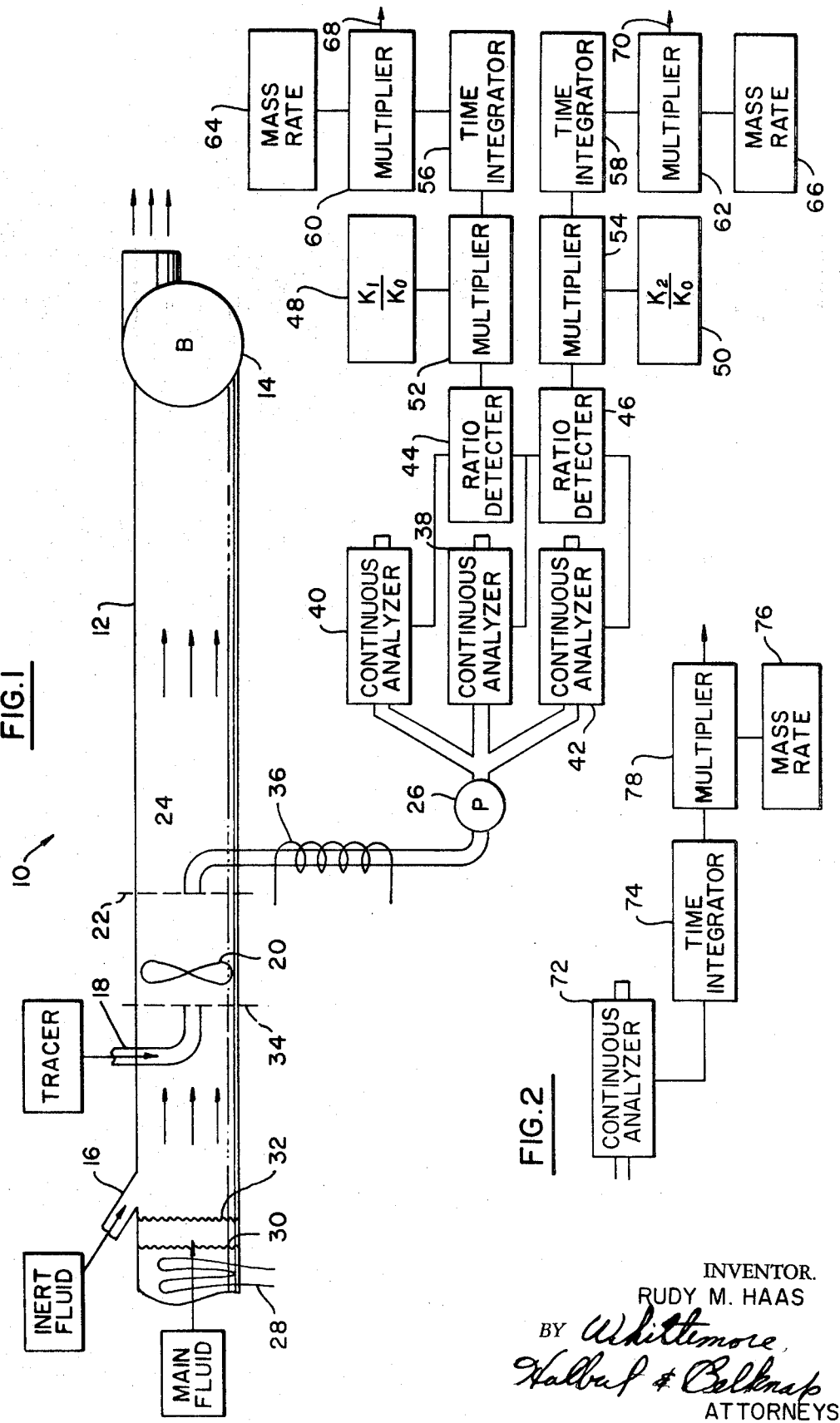

CHEMICAL TRACER METHOD OF AND STRUCTURE FOR DETERMINATION OF INSTANTANEOUS AND TOTAL FLUID FLOW MASS AND VOLUME

BACKGROUND OF THE INVENTION

1. Field of the Invention

The invention relates to determination of mass and volume flow of selected components of a fluid and refers more specifically to a chemical tracer method of and structure for determination of total and instantaneous mass and volume flow of selected fluid components in automobile exhaust pipes, smokestacks, pipe lines and the like. One of the advantages of the method and structure of the invention is that the flow rate, pressure and temperature of the fluid can vary during practice of the method with the structure disclosed.

2. Description of the Prior Art

In the past, most approaches to air pollution control through the measurement of total emission and regulation thereof by government agencies and the like have required a knowledge of both concentration and total volume of emission. It is preferable, however, to have knowledge of the total mass emission of each component of interest without the necessity of determining the total volume of emission. This is especially true in determining mass emission from industrial smokestacks, automobile tailpipes and industrial and community sanitary systems.

SUMMARY OF THE INVENTION

In accordance with the invention, total mass flow of selected components in a main fluid flow are determined by insertion of a chemical tracer into the main fluid flow, sampling the main fluid flow after the insertion of the tracer therein, providing ratios of the tracer component to each of the components of interest in the total fluid flow, integrating the ratios with respect to time and multiplying the result of the integration by the mass flow rate of the chemical tracer inserted in the main fluid flow. Total particulate mass flow and total volume flow as well as instantaneous mass, particulate mass and volume flow may be determined by similar methods and structures for effecting the methods similar to the structure illustrated.

In determining total mass flow, simplified calculations are permitted if the total pressure and temperature of the main fluid flow are constant and the mass flow rate of the tracer is also constant. A further simplification is possible when the concentration of the component of interest in the main fluid flow is also constant. When the total volume flow of a component of interest is known between determined times, the total volume flow between other times may also be determined in accordance with the invention.

Further in accordance with the invention, tracer concentration in either the main fluid flow tube or analyzers may be used in determining mass, particulate mass and volume flows and compensation for a tracer component already in the main fluid flow is possible. Also, a method of determining the increase in concentration of tracer due to tracer injection at a constant mass rate and a method of cancellation of the effect of tracer upstream of the point of injection of tracer into the main fluid flow is also disclosed.

The use of a light beam having both a reference and a sample wavelength band where the reference wavelength band is not absorbed (or has a constant absorption) by a moving fluid but is blocked by particles moving within the fluid, while the sample wavelength band is absorbed by the moving fluid and blocked by the particles within it, has also been considered. By taking a ratio of these two wavelengths signals after such absorption, the effect of the particles can be canceled out and by using the sample beam wavelength for the tracer component with or without another sample beam wavelength for the component of interest, the volume or mass flow respectively can be determined in a fluid where there are particles present, as for example, in the stack of a power plant. The reference wavelength should not be absorbed by any component whose concentration does vary over the time interval when the measurements are taken. The use of this method for volume or mass determination wherein a tracer is used is believed to be novel.

BRIEF DESCRIPTION OF THE DRAWINGS

FIG. 1 is a partially diagrammatic and partially block diagram of structure constructed in accordance with the invention for determination of instantaneous and total, mass, particulate mass and volume flow of selected components of a fluid by chemical tracer methods in accordance with the invention.

FIG. 2 illustrates a modification of the structure of FIG. 1 particularly suited to determining total volume flow of a component of interest in a gas by the method of the invention.

DESCRIPTION OF THE PREFERRED EMBODIMENTS

The structure 10 for determining the total mass flow over a selected time of a component of interest in a main fluid flow illustrated in FIG. 1 includes a main fluid flow tube 12 through which the fluid to be analyzed is passed. The fluid to be analyzed may be drawn through the tube 12 by means of the blower 14 or similar apparatus to provide a uniform flow rate for the main fluid.

If the main fluid flow is not sufficient to fill the tube 12, additional inert fluid may be injected into the main fluid flow through the tube 16 connected to the tube 12 as shown. Thus, the main fluid flow rate may more easily be maintained constant.

A tracer which disperses readily in the main fluid flow and is readily analyzable is injected into the main fluid flow tube 12 through the tracer injection tube 18 substantially centrally of the main tube 12. The exact location of the tracer injection tube does not have to be as shown in FIG. 1. The tracer can be injected through tube 16, or if the main fluid flow is constant it can be injected prior to the site of the inert fluid inlet tube 16.

The main fluid flow, inert fluid if any, and injected tracer are mixed by mixer 20. The tracer is thus uniformly distributed over the cross section 22 of the main tube 12. A sample of the mixed tracer and main fluid (assuming no inert fluid is necessary) is withdrawn from the main fluid flow tube 12 through the sample tube 24 and is passed to the pump 26.

Prior to the tube 16, a heat exchanger 28, a particle filter 30 and a condenser 32 can be provided to prevent volume changes, particle deposition, or condensation respectively before or in the analyzers. The main fluid is maintained at a constant temperature by the heater 28, undesirable particles are filtered therefrom and moisture is condensed therefrom prior to injection of the tracer thereinto at the cross section 34 of the tube 12.

In addition, a heater 36 may be provided anywhere in the apparatus 10 to maintain the temperature of the main fluid flow and/or sample substantially constant.

The sample of the tracer and main fluid is passed through the pump 26 to the continuous analyzers 38, 40 and 42. Analyzers 38, 40 and 42 for analyzing the concentration of tracer and the concentration of two components of interest in the main fluid flow respectively are well known items of commerce and will not be considered in detail herein, except to say that the analyzers should be linear or should be linearized. The analyzers can be of a flow or non-flow rate dependent variety. Analyzers of the non-dispersive infrared or ultraviolet type are well suited to this type of analysis and may be purchased from The Beckman Instrument Company as Model 315, non-dispersive infrared analyzer. The continuous analyzers will provide an output signal which is proportional to and varies in accordance with the concentration of the tracer and components of interest in the main fluid flow tube 12 at cross section 22. If the output signal of the analyzer used is not linear with respect to the concentration, a linearizing electronic circuit, a calibration curve equation along with a computer, or in the case of a photometric analyzer, a log of the reciprocal transmission may be used.

The signals from the analyzers 38 and 40 and from the analyzers 38 and 42 are passed to ratio determining circuits 44 and 46 from which signals proportional to and varying in accordance with the ratio of the concentration of tracer to the concentration of the separate components of interest of the main fluid flow at the cross section 22 are provided. The ratio signals are then multiplied by desired proportionality factors between circuit parameters constants $K_0$, $K_1$ and $K_2$ from circuits 48 and 50 in multipliers 52 and 54. The signals from the multipliers 52 and 54 are then integrated over the time the total masses of the components of interest are desired in the integrators 56 and 58. The integrated signals are subsequently multiplied in multipliers 60 and 62 by signals proportional to the mass rate of injection of tracer into the main fluid from circuits 64 and 66 to provide output signals on conductors 68 and 70 representative of the total mass of the components of interest during the time of integration.

In the apparatus of FIG. 1, it is essential that the tracer be injected at a constant mass rate. The rate may be based on the required concentration needed to give satisfactory analytical results in analyzer 38.

The tracer, which may be continuously analyzed as carbon dioxide and injected at a known constant mass rate of a fossil fuel equivalent to a known constant mass rate of carbon dioxide when the main fluid is combustion gases, must pass the hypothetical cross sectional area 22 at the same rate as the tracer is injected into the main fluid flow tube 12 at the hypothetical cross section 34.

The fluid flow to the continuous analyzers 38, 40 and 42 must originate from the same volume in the main fluid flow tube 12, and should arrive at each analyzer for analysis at the same time. Otherwise, part or all of the data at the analyzers must be stored and subsequent calculations must be conducted with the stored data sometime in the future.

The tracer injection may be a pure component or a mixture having a pure tracer component plus an inert ingredient. In addition, the tracer must be accurately qualitatively and quantitatively analyzable on a continuous basis and should not undergo a chemical change unless the extent of the chemical reaction is known and its products are easily analyzable.

The linear flow velocity in the sampling line 24 does not have to be equal to that of the linear flow velocity in the main fluid flow tube 12, but it should be constant and preferably greater than that in the main fluid flow tube. In addition, conditions which are established in the standardization of the analyzers 38, 40 and 42 such as temperature and pressure must not vary before the unknown mixtures have been analyzed.

The pump 26 for the continuous analyzers should be of a non-contaminating and non-corrosive material. A diaphragm-type pump is generally satisfactory. Additional pumps may be required to maintain consistency in flow in both the main fluid flow tube 12 and in the sample tube 24.

Thus, in operation of the apparatus 10, a fluid such as automobile engine exhaust gas is passed into the main fluid flow tube 12 past the temperature control structure 28 where the temperature is made constant. Particles are filtered from the exhaust and any moisture therein is condensed by the filter 30 and condensation structure 32, or it may be made constant by adding a stream of water vapor.

If the quantity of exhaust gas is not sufficient to provide a constant flow rate in the main fluid flow tube 12, an additional inert gas can be injected into the fluid flow tube 12 through the tube 16 sufficient to provide a constant main fluid flow through the main fluid flow tube 12.

On passing the cross section 34 in the main fluid flow tube 12, a tracer chemical such as carbon dioxide is injected into the main fluid flow at a constant mass rate. A constant mass rate may be maintained by the use of known flow rate devices such as a critical orifice, a constant diffusion permeation tube, or a constant energy addition producing a constant mass rate of another substance, e.g., an electrochemical decomposition, etc., which will not be considered in detail herein.

The main fluid flow and tracer are mixed by mixer 20 to provide a uniform mixture at the cross section 22 of the main fluid flow tube 12. After passing the sample tube 24 at the cross section 22, the main fluid flow is passed through the blower or pump 14 and is exhausted from the main fluid flow tube 12. A blower is usually satisfactory for gases and a transfer pump for liquids.

The sample of the mixed main fluid flow and tracer is passed through pump 26 to the continuous analyzers 38, 40 and 42 which analyze the concentration of the tracer and the components of interest in the main fluid flow. The electrical signals from the analyzers are passed to the ratio determining circuits 44 and 46 so that out of the ratio determining circuits 44 and 46 a ratio of the concentration of the components of interest to the tracer concentration in the main fluid flow is provided.

These ratio signals are then multiplied by signals from the circuits 48 and 50 to compensate for the electrical differences in the analyzer circuits and are subsequently integrated by integrators 56 and 58 over the time that the total mass flow of the components of interest of the main fluid flow is desired. The integrated signals from the integrators 56 and 58 are subsequently multiplied in the multipliers 60 and 62 by a signal representing the mass flow rate of the tracer to provide the conductors 68 and 70 with a signal representing the total mass of the components of interest flowing in the main fluid flow over the time of integration. This electronic signal can be fed to a digital readout, a paper printer, a computer, etc., or can be used to actuate an electronic switch.

The operation of the apparatus 10 can be mathematically shown to be theoretically correct. Thus, the relationship of mass ($m_1$), volume ($V_1$), and concentration ($C_1$), of a component of interest, with concentration expressed as mass per unit volume, is given below:

$$m_1 = C_1 V_1$$

The same relationship holds for the tracer component and is shown by the equation:

$$m_o = C_o V_o$$

Since the volume of tracer component and the component of interest in the sample are the same, $V$ is the same as indicated by the equation:

$$V_1 = V_o = V$$

Therefore, $m_1 = C_1/C_o\, m_o$, wherein $C_1$ and $C_o$ are both considered to be at the same temperature and pressure since both are referred to the same uniform composition which therefore is considered to be the same chemically and physically throughout.

The instantaneous mass flow rate of the component of interest, that is, $(dm_1/dt)$ passing through the cross sectional area 22 can be expressed as a function of $C_1$, $C_o$ and $(dm_o/dt)$, where $(dm_o/dt)$ is the instantaneous mass flow rate of the tracer, $$(dm_1/dt) = C_1/C_o\, (dm_o/dt)$$

In this equation, $C_1/C_o$ is the proportionality constant relating mass of the tracer component transferred across the cross sectional area 22 to the mass of the component of interest also transferred across the same area where some, all, or none of the above four values may vary with time.

The total mass flow of component one, that is, $m_1$ from $t_1$ to $t_2$, is obtained by the integration of the above equation to give $$\int_{(m_1)\,t_2}^{(m_1)\,t_2} dm_1 = \int_{t_1}^{t_2} \left(\frac{dm_o}{dt}\right) \frac{C_1}{C_o} dt$$

Since the mass flow rate of the tracer through the cross sectional area 22, $(dm_o/dt)$, is adjusted to be and remains the same as the constant mass injection rate of the tracer $(dm_o/dt)_o$, that is to say, $(dm_o/dt)_0 = $ a constant. Therefore, $$(m_1)t_2 - (m_1)t_1 = \left(\frac{dm_0}{dt}\right)_0 \int_{t_1}^{t_2} \frac{C_1}{C_0} dt$$

where $(m_1)t_2 - (m_1)t_1$ represents a difference in mass of the component of interest passing through the cross sectional area 22 from time $t_1$ to $t_2$.

Under actual flow conditions wherein variations in flow of the main fluid flow occur, it is difficult to maintain the tracer mass injection rate $(dm_o/dt)_o$ equal to the mass flow rate of the tracer through the cross sectional area 22.

However, if the linear flow rate is a large value between the cross sectional area 34 and the cross sectional area 22; that is, between the point of injection of the tracer and the point of taking of the sample of the mixed tracer and total fluid flow, or the distance between the point of injection of the tracer and the point at which the sample is removed is small, or there is no extended period of flow stoppage or fast variations in flow rate, especially if they occur frequently, the difference between $(dm_o/dt)$ and $(dm_o/dt)_o$ will not be great. In this regard, it is desired to keep $(dm_o/dt)_o$ as constant as possible at some one known value.

Evaluation of the concentration ratio time integral provided above over the period $t_1$ to $t_2$ is usually not possible with a predetermined mathematical equation since no prior information is available for $C_1/C_o$ as a function of time. Since the ratio $C_1/C_o$ varies with time, it is necessary to take the ratio of the analyzer output signal, usually voltage, of two analyzers, which must be of the continuous type for concentrations that vary, one for the tracer and one for each of the components of interest whose total mass flow in the time interval $t_1$ to $t_2$ is to be determined. The output of each analyzer is then multiplied by a proportionality constant, K, such that if voltages $V_1$ and $V_2$ are the voltages from the analyzers, the following equation is true:

$$C_1/C_o = (k_1/k_o)(V_1/V_o)$$

The resulting proportionality signal, equal to the ratio of the above concentrations, is then integrated over the time interval $t_1$ to $t_2$. The integrated proportionality signal is then multiplied by the constant mass injection rate of the tracer, $(dm_o/dt)_o$ which is equal to $(dm_o/dt)$, which is known. The result of this final multiplication is the total mass emission value of the component of interest which has passed through the cross sectional area 22 between the time $t_1$ and $t_2$.

As a consequence of the constant mass flow rate of tracer in the main stream which can also be expressed in terms of a definite number of moles, i.e., a definite number of molecules, there must also exist a constant total molecular flow of all the components present in the main fluid flow, expressed in terms of a constant number moles of components per unit of time. In this regard, constant flow is considered to mean not changing. The flow can be different in linear velocity along the path of travel thereof since the cross sectional area is reduced, the linear fluid velocity is increased through this area.

Since both gaseous and liquid fluids are not "ideal" in most cases, in order to obtain a constant mass flow rate on a continuous basis, it would be necessary to run the system in such a way that either the temperature or pressure or both can be changed in order to maintain the constant mass flow rate of the tracer or the total molecular flow rate of all the components. On a practical basis, this is not done. With gases, low temperatures and high pressures produce the greatest deviation from constant total molecular flow rate due to their effect on or variation of the compressibility factor of the gases. Thus, operation of the system 10 at low temperatures and high pressures is to be avoided. In addition, to prevent condensation or absorption of the tracer, as well as those of the other species present, the former, mainly higher temperatures and lower pressures are preferred.

In the case where the mass flow rate of the tracer in the main flow stream, the total pressure and temperature are all held constant, the volumetric flow rate is also constant, assuming ideal fluid behavior, which assumption is usually valid for most fluids wherein only a slight molecular interaction is present. As a result of this constancy in the physical conditions of the tracer concentration, $C_o$, this term can be brought out in front of the integral sign, so that the above final equation for determination of total mass then becomes the equation indicated below:

$$(m_1)_{t_2} - (m_1)_{t_1} = \left(\frac{dm_o}{dt}\right)_o \frac{1}{C_o} \int_{t_1}^{t_2} C_1 dt$$

This equation is equivalent to the following equation since $dV/dt = (dm_o/dt)_o \cdot 1/C_o$, i.e., the volumetric flow rate in the main fluid flow tube 12:

$$(m_1)_{t_2} - (m_1)_{t_1} = \frac{dV}{dt} \int_{t_1}^{t_2} C_1 dt$$

If $C_1$ is also constant under the same conditions; that is, if the mass emission rate of one component $(dm_1/dt)$ from a source is constant, $C_1$ can also be brought in front of the integral sign and only an integration of the time differential is necessary, so that the final total mass flow equation becomes:

$$(m_1)_{t_2} - (m_1)_{t_1} = (dm_o/dt)_o (C_1/C_o) (t_2-t_1)$$

In the case where the volumetric flow rate of the main fluid flow at a constant temperature and pressure is constant, $C_o$ is also constant. In such case, the main volumetric flow can be calibrated first for total volume flow with the equation $V = m_o/C_o$. The concentration of the component of interest can then be obtained and integrated over the time of $t_1$ to $t_2$. The product of this total volume and the average concentration of $C_1$ will then give the total mass.

In combustion processes where the fuel consumption is approximately constant and complete for a particular species, the fuel mass or a constant fraction thereof could be used as the source of the constant mass of the injected tracer and the above volume or mass determination can be made. With such volume or mass determinations, only approximate values can be obtained.

The same final mass equation given above is used for particulate material; that is, continuous analyzer 40 is calibrated with a standard smoke, suspension, optical filter of a predetermined transmission (intensity and wave length) which is equivalent to a definite concentration and type (size, shape, etc.) composition containing particulate material. An effective $C_1$ can be determined photometrically and expressed mathematically as $C_1 = 1/a_1 l \log_{10} 1/T$, where $T$, the transmittance, is defined as the ratio of the intensity of the transmitted light per unit of incident light; $l$ is the path length of the light absorption medium; and $a_1$ is the average absorption coefficient of the particulate material whose mass is being determined. If $C_1$ and $l$ are expressed in units of mass per unit volume and length respectively, then $a_1$ will have units of area per unit mass. It is important here that the heterogeneous composition is uniform over the cross sectional area.

The total volume flow of a component of interest of the main fluid flow may also be determined for most compositions by the same tracer technique used in determining the total mass of a component of interest. In such a determination, the flow system illustrated in FIG. 1 down through the pump 26 is utilized. Following the pump 26, only a single analyzer 72, integrator 74, mass rate signal producing circuit 76 and multiplier 78, as shown in FIG. 2, are necessary to produce a total value output signal. The mathematical computations to illustrate the theoretical accuracy of such a system are simplified relative to the total mass computations.

In developing a simplified mathematical equation for total volume of a component of interest, the same symbol definitions are used as in the mass determination. Thus, the following equations are true:

$$m_o = C_o V \ ; \ (dm_o/dt) = C_o(dV/dt); \ dV/dt = (dm_o/dt) 1/C_o$$

The total volumetric flow from time $t_1$ to $t_2$; that the time integral of the last above equation is given below:

$$\int_{(V)_{t_1}}^{(V)_{t_2}} dV = \int_{t_1}^{t_2} \left(\frac{dm_o}{dt}\right) \frac{dt}{C_o}$$

Then, since the mass flow rate of the tracer passing through the cross sectional area 22 equals the constant mass injection rate of the tracer, that is, $(dm_o/dt) = (dm_o/dt)_o$ equals a constant independent of time, the following final volumetric equation results:

$$(V)_{t_2} - (V)_{t_1} = \left(\frac{dm_o}{dt}\right)_o \int_{t_1}^{t_2} \frac{1}{C_o} dt$$

If the temperature, pressure and volumetric flow rate are constant, then $C_o$ is also constant and it can be brought in front of the integral sign followed by its time integration as indicated in the following equation:

$$(V)_{t_2} - (V)_{t_1} = \left(\frac{dm_o}{dt}\right)_o \frac{1}{C_o} \int_{t_1}^{t_2} dt = \left(\frac{dm_o}{dt}\right)_o \frac{(t_2-t_1)}{C_o}$$

The above integral is evaluated in the same manner as described for the total mass calculation with the exception that the concentration of the one component, that is, the tracer is continuously analyzed.

If the total volumetric flow between times $t_2$ and $t_1$ are determined with the above equation, the total volumetric flow at a constant temperature and pressure can be computated for a known longer perior of time with the following equation wherein $V_{t_3}$ and $V_{t_2}$ and $V_{t_1}$ are the total final, intermediate and initial volumes and where $t_3$, $t_2$ and $t_1$ are the final, intermediate and initial times respectively:

$$V_{t_3} - V_{t_1} = (V_{t_2} - V_{t_1})(t_3 - t_1)/(t_2 - t_1)$$

This method of determining volumetric flow is useful in checking the constancy of the volumetric flow rate of the fluid for a definite temperature and pressure by continuously analyzing for $C_o$ and checking the constancy thereof.

Although the ratio of the concentrations; that is, $C_1/C_o$, in the above equations refers to the concentrations of the fluid which is present in the main flow stream, the ratio should not be different at different temperatures and pressures in the analyzers. This assumption is made assuming ideal fluid behavior, which is a good approximation in most cases if the variation in properties is not too great.

The concentration of tracer component discussed in all the equations referred to so far are those conditions within the main flow tube. In order to express concentrations in terms of the conditions in the analyzer, assuming they are not the same conditions of temperature and pressure as in the main flow tube, the following equation which can be derived easily, can be used if gases are involved:

$$C_o = M_o \, 10^{-6}/R \, Z \, [(P)(ppm)_o/(T)]$$

where $C_o$, $M_o$, $P$, $T$, $(ppm)_o$ and $Z$ are the tracer concentration (expressed in mass per unit volume), tracer molecular weight, ideal gas constant, total pressure, absolute temperature, tracer concentration in ppm by volume (same in main flow stream as in analyzer) and compressibility factor respectively.

Another means of expressing the tracer concentration (mass per unit volume) of a gaseous system in the main flow tube and analyzer is:

$$(C_o)_2/(C_o)_1 (Z_1 P_2 T_1/Z_2 P_1 T_2)$$

where the subscripts of 2 and 1 refer to the analyzer and main flow stream respectively. The advantage here is that the removal of the compressibility factors in the equation can be achieved by using conditions of temperature and pressure which are about the same in both the analyzer and the main flow tube or where the gaseous mixture behaves ideally over the range of temperature and pressure variations involved.

If the component used as the tracer is already present in the main fluid flow, then the following equation is used for the total mass flow:

$$(m_1)_{t_2} - (m_1)_{t_1} = \left(\frac{dm_0}{dt}\right)_0 \int_{t_1}^{t_2} \frac{C_1}{(C_a - C_b)_0} dt$$

and the following equation is used for the total volume flow:

$$(V)_{t_2} - (V)_{t_1} = \left(\frac{dm_0}{dt}\right)_0 \int_{t_1}^{t_2} \frac{1}{(C_a - C_b)_0} dt$$

If $(C_a - C_b)_o$ is a constant in either of the above volume or mass flow equations, it can be brought in front of the integral sign. In the case where the component $C_1$ and the added tracer are of the same kind; that is, $C_1 = C_b$, $C_a - C_b = C_a - C_1$.

Here $C_a$ is the sum of the concentrations of the tracer component added to that which was already present in the main flow, and $C_b$ is the concentration of the tracer component which was already present. All the values of $C_a$, $C_b$ and $C_1$ must be expressed under the same conditions of temperature and pressure and in the same units of concentration. The remaining symbols have the same meaning as before.

In order to measure the increase in concentration of the tracer due to its injection at a constant mass rate, it is continuously sampled at a point before the tracer injection site and at a point where the tracer has become a part of the flowing uniform composition. For example, using a continuous flow analyzer with dual flow cells, it is possible to cancel out the effective upstream concentration of the tracer component which is present upstream of the site, where the tracer is to be injected at a constant mass rate. Here the reference flow cell has the original fluid passing through it from before the injection and the sample flow cell has a mixture of the original plus that with the tracer addition, passing through it.

The time required for a fluid which has a constant (assuming no temperature and pressure variation) volumetric flow rate to reach and pass through the analyzer flow cells from the sample taking point, should be the same for analyzers used in the same computation (i.e., theoretically the same original composition should reach both analyzer flow cells at the same time, as if no tracer component was injected externally). When there is an injection of the tracer, there should be an increase in concentration in that sampling line which is located after the main flow has undergone a mixing process. For combustion processes where determination of $CO_2$ concentration is not necessary, the use of $CO_2$ as the tracer is practical, assuming the temperature of the flow system is at a high enough temperature to prevent condensation and adsorption.

In addition to continuous sampling, analysis and integration of instantaneous concentration values of the components of interest from the main flow stream, it is also possible to collect in chemically inert containers (usually flexible for a gas and rigid for a liquid) the total of the instantaneous sampling fluid.

The mixture in the container is either (1) mixed continuously and the instantaneous composition of the mixture is continuously analyzed non-destructively (i.e., analysis has no effect on it) and the analyzed composition is returned to the original container, or (2) the total mixture is mixed uniformly, then it is analyzed. In the second case, where the instantaneous fluid is collected during the period from $t_1$ to $t_2$ in the container, the same final equation, $$(m_1)_{t_2} - (m_1)_{t_1} = \left(\frac{dm_0}{dt}\right)_0 \int_{t_1}^{t_2} \frac{C_1}{C_0} dt$$

is used, but the concentrations $C_1$ and $C_o$ are not the same, but their final ratio is the same as for the above equation, i.e., they are instantaneous average concentration values resulting from the mixing of the various components of the fluid in the container. As a result, $$\int_{t_1}^{t_2} \frac{C_1}{C_0} dt = \frac{\overline{C_1}}{\overline{C_0}} (t_2 - t_1)$$

Therefore, upon replacement, $$(m_1)_{t_2} - (m_1)_{t_1} = (dm_0/dt)_0 (\overline{C_1}/\overline{C_0})(t_2 - t_1)$$

where $\overline{C_1}/\overline{C_0}$ refers to the ratio of the average value of $C_1$ divided by the average value of $C_o$.

In this method of collecting the fluid, the same principles hold as in the direct integration method including the equations (except the concentrations here are average values rather than instantaneous ones) the ratios $C_1/C_0$ are also not affected by changes of temperatures and pressure between the main flow stream and the analyzers, but in the collection of the sample, the temperature, pressure and flow rate must be held constant. By being able to store the collected sample, it can be permitted to react (e.g., dissolving $NO_x$ exhaust gases in a Saltzmar reagent); but in most cases, reaction due to storage is a disadvantage.

While one embodiment and a modification of the present invention have been described in detail, it will be understood that other embodiments and modifications are contemplated by the inventor. Thus, for example, the analyzable tracer component may be either chemical or radioactive. It is therefore the intention to include all modifications and embodiments of the invention as are defined by the appended claims within the scope of the invention.

What I claim as my invention is:

1. The method of determination of at least one of the total mass of a component of interest in a flowing main fluid and volume of a flowing main fluid in a period of time comprising the injection of an analyzable tracer component at a constant mass rate into the flowing main fluid, mixing the tracer continuously with the flowing main fluid flow, passing the mixed tracer and main fluid flow across a cross sectional area so that the mass flow rate of the tracer at the cross sectional area is equal or at least approximately equal to the mass injection rate of the tracer, analyzing a sample of the uniform mixture at the cross sectional area to determine the concentration of at least one of the tracer and at least one component of interest in the sample, integrating a signal derived from the determined concentration in the sample over the time period, and multiplying the time integrated signal by the mass rate of tracer injection.

2. The method as set forth in claim 1, wherein the total mass of the components of interest is determined, the concentration of tracer in the sample and the concentration of one or more of the components of interest in the sample are determined, a ratio between the tracer concentration and component of interest concentration is provided and the ratio is integrated over the time period from time $t_1$ to time $t_2$ in accordance with the formula:

$$(m_1)_{t_2} - (m_1)_{t_1} = \left(\frac{dm_0}{dt}\right)_0 \int_{t_1}^{t_2} \frac{c_1}{c_0} dt$$

where $(dm_0/dt)_0$ is the mass flow rate of the tracer and $c_1/c_0$ is the concentration of the component of interest divided by the concentration of the tracer.

3. The method as set forth in claim 2, wherein the component of interest is particulate matter, and further including maintaining the cross sectional area of the main fluid flow as a uniform heterogeneous composition.

4. The method of determination of the total volume of a flowing main fluid in a period of time comprising the injection of an analyzable tracer component at a constant mass rate into the flowing main fluid, mixing the tracer continuously with the main fluid flow, passing the mixed tracer and main fluid flow across a cross sectional area so that the mass flow rate of the tracer at the cross sectional area is equal or at least approximately equal to the mass injection rate of the tracer, analyzing a sample of the uniform mixture at the cross sectional area to determine the concentration of the tracer in the sample, integrating a signal which is representative of the reciprocal of the concentration of the tracer in the sample over the time period, and multiplying the time integrated signal by the mass injection rate of the tracer to provide the total volume flow over the time period in accordance with the formula $$(V)_{t_2} - (V)_{t_1} = \left(\frac{dm_0}{dt}\right)_0 \int_{t_1}^{t_2} \frac{1}{C_0} dt$$

where, $(V)_{t_2} - (V)_{t_1}$ is the total volume flow over the time period $(dm_0/dt)_0$ is the mass injection rate of the tracer and $1/C_0$ is the reciprocal of the concentration of the tracer.

5. The method as set forth in claim 4, and further including maintaining at least one of the temperature, pressure and volumetric flow rates constant.

6. The method as set forth in claim 5, and further including determining the main volumetric flow for a period by multiplying the volumetric flow for an initial shorter period by the resultant of the new total time period divided by the initial total time period.

7. The method as set forth in claim 1, and further including compensating the tracer concentration for differences between tracer concentration in a main fluid flow tube and tracer concentration in an analyzer due to temperature and pressure differences in the main fluid flow tube and in the analyzer.

8. The method as set forth in claim 1 and further including compensating the tracer concentration at the sampling point for initial tracer concentration in the main fluid flow.

9. The method as set forth in claim 1, wherein the main fluid flow is continuous when the analyzer measurements are being made.

10. The method as set forth in claim 1, wherein the main fluid is a total of fluid flow over a predetermined time.

11. The method as set forth in claim 1, and further including the step of inserting additional fluid in the main fluid to provide a constant or nearly so, volumetric flow rate.

12. The method as set forth in claim 1, and further including at least one of the steps of heating, filtering and condensing moisture from the main fluid prior to injection of the tracer therein.

13. Structure for determining at least one of the total mass flow of a component of interest and the total volume flow of the main fluid over a period of time comprising a main tube, means for drawing the main fluid through the main tube, means for injecting a tracer into the fluid as it is drawn through the main tube, and means for withdrawing a portion of a mixture of the tracer and main fluid from the tube at a predetermined cross section subsequent to injection of the tracer into the main fluid, means for analyzing the sample to provide a signal representative of the concentration of at least one of the tracer and at least one component of interest therein, integrating the analyzed sample signal over the period of time and multiplying the analyzed, integrated sample signal by the mass rate of tracer injection.

14. Structure as set forth in claim 13, wherein the analyzing means includes means for analyzing the tracer concentration and the concentration of the component of interest in a single analyzer and providing a ratio therebetween and the ratio is integrated over the period of time whereby the total mass flow of the component of interest over the period of time of integration is provided.

15. Structure as set forth in claim 13, and further including means for inserting inert fluid in the main fluid flow tube to maintain a constant main fluid flow in the tube.

16. Structure as set forth in claim 13, and further including means for compensating for the effect of tracer component present in the main fluid flow prior to the constant mass injection site of the tracer component.

17. Structure as set forth in claim 13, and further including means for mixing the main fluid to provide a uniform dispersion of the tracer in the main fluid flow at the cross section of sample removal.

18. Structure as set forth in claim 13, and further including at least one of means for heating, means for filtering and means for condensing moisture from the main fluid flow in the main fluid flow tube.

19. Structure as set forth in claim 13, and further including means for linearizing the analyzer means output signals connected to the analyzer means.

20. Structure for determining at least one of the total mass flow of a component of interest and the total volume flow of the main fluid over a period of time comprising a main tube, means for drawing the main fluid through the main tube, means for injecting a tracer into the fluid as it is drawn through the main tube, and means for withdrawing a portion of a mixture of the tracer and main fluid from the tube at a predetermined cross section subsequent to injection of the tracer into the main fluid, means for analyzing the sample to provide signals representative of at least one of the concentration of at least one component of interest therein and the reciprocal of the concentration of the tracer therein and means for integrating at least the reciprocal signal over the period of time and multiplying the integrated signal by the mass rate of tracer injection.

* * * * *